(12) United States Patent
Popescu et al.

(10) Patent No.: US 7,565,037 B2
(45) Date of Patent: Jul. 21, 2009

(54) REDUCING DEPOLARISATION

(75) Inventors: Sandu Popescu, Bristol (GB); Serge Alexandre Massar, Brussels (BE)

(73) Assignees: Universite Libre de Bruxelles, Brussels (BE); University of Bristol, Bristol (GB)

( * ) Notice: Subject to any disclaimer, the term of this patent is extended or adjusted under 35 U.S.C. 154(b) by 0 days.

(21) Appl. No.: 11/660,059

(22) PCT Filed: Aug. 12, 2005

(86) PCT No.: PCT/GB2005/003194

§ 371 (c)(1),
(2), (4) Date: Oct. 4, 2007

(87) PCT Pub. No.: WO2006/016187

PCT Pub. Date: Feb. 16, 2006

(65) Prior Publication Data

US 2008/0056729 A1    Mar. 6, 2008

(30) Foreign Application Priority Data

Aug. 12, 2004    (GB) .................. 0418069.1

(51) Int. Cl.
*G02F 1/01* (2006.01)
(52) U.S. Cl. .............. 385/1; 385/100; 398/25; 398/152; 398/147; 398/161; 356/477; 356/369; 356/73.1
(58) Field of Classification Search ........ 385/1
See application file for complete search history.

(56) References Cited

U.S. PATENT DOCUMENTS

| | | | |
|---|---|---|---|
| 5,298,047 A | | 3/1994 | Hart, Jr. et al. |
| 6,278,828 B1* | | 8/2001 | Stocklein et al. ............ 385/123 |
| 6,594,408 B1* | | 7/2003 | Noe ............................ 385/11 |
| 6,856,711 B1* | | 2/2005 | Frigo et al. ................... 385/11 |
| 2003/0048972 A1* | | 3/2003 | Lin et al. ...................... 385/11 |
| 2003/0101774 A1* | | 6/2003 | Oh et al. ...................... 65/488 |
| 2007/0046928 A1* | | 3/2007 | Chen et al. ................. 356/73.1 |
| 2007/0296977 A1* | | 12/2007 | Madsen ..................... 356/477 |
| 2008/0002972 A1* | | 1/2008 | Dogariu et al. ............... 398/25 |

FOREIGN PATENT DOCUMENTS

| EP | 1 148 373 A | 10/2001 |
|---|---|---|
| WO | 01/57585 A1 | 8/2001 |

OTHER PUBLICATIONS

Nolan et al., "Fibers with low polarization-mode dispersion", Journal of Lightwave Technology, IEEE USA, Apr. 4, 2004, p. 1066-1077, vol. 22, No. 4.

(Continued)

*Primary Examiner*—James P Hughes
(74) *Attorney, Agent, or Firm*—Sughrue Mion, PLLC

(57) ABSTRACT

The present invention provides a method for reducing spreading of a pulse in a transmission line, said spreading being as a result of polarization mode dispersion, comprising inducing predetermined polarization rotations of particle or wave components of the pulse in the transmission line.

35 Claims, 6 Drawing Sheets

OTHER PUBLICATIONS

Noe et al., "Endless polarization control systems for coherent optics", Journal of Lightwave technology, IEEE, Jul. 7, 1988, p. 1199-1208, vol. 6, No. 7., New York.

Merker et al., "PMD compensation up to second order by tracking the principle states of polarization using a two-section compensator", Optics Communications, Oct. 15, 2001, p. 41-47, vol. 198, No. 1-3, North-Holland Publishing Co., Amsterdam, NL.

Chertkov et al., "Periodic compensation of polarization mode dispersion", Journal of the Optical Society of America B (Optical Physics), Mar. 3, 2004, p. 486-498, vol. 21, No. 3., USA.

* cited by examiner

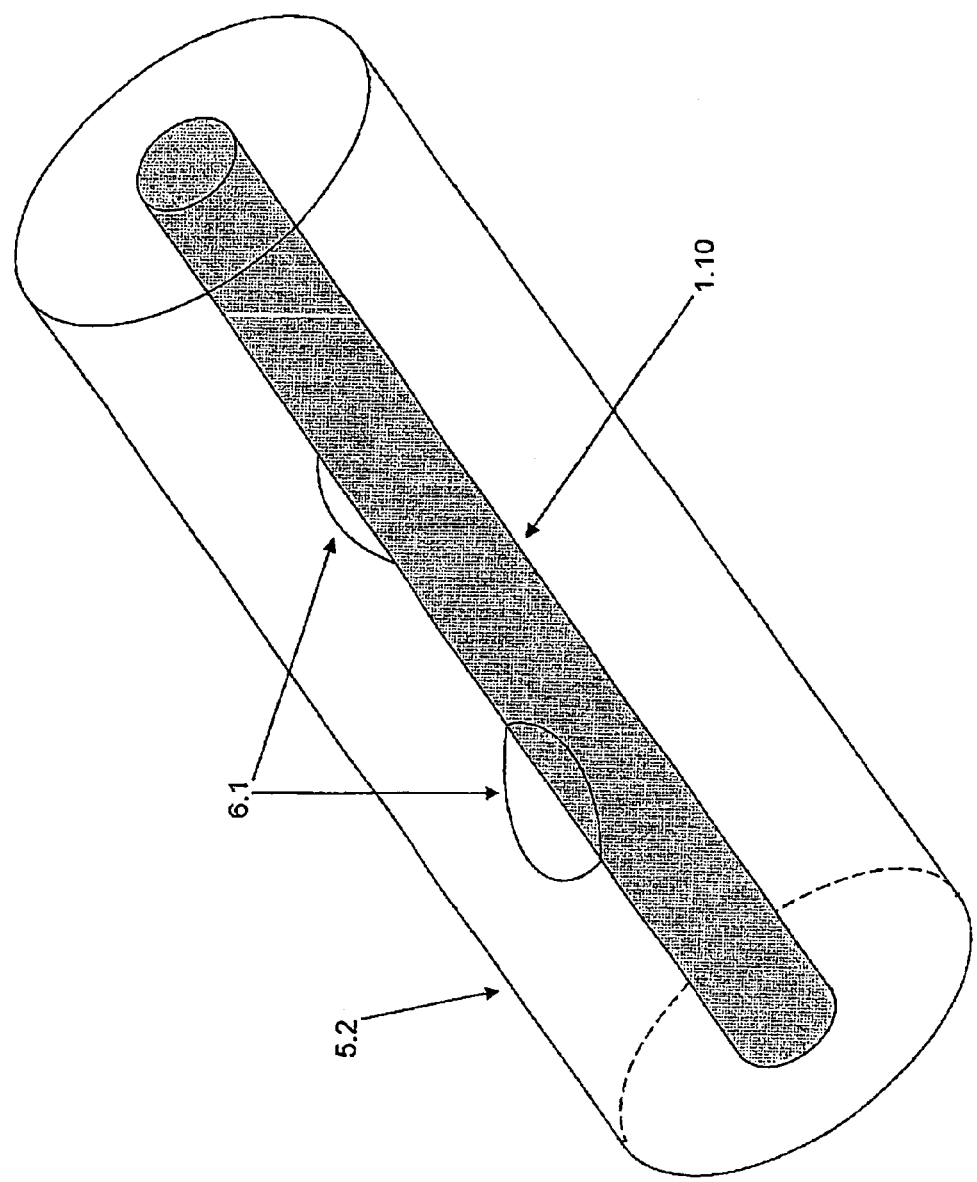

REDUCING DEPOLARISATION

TECHNICAL FIELD

The present invention relates to the field of communication systems, in particular to the transmission of pulses and/or information in a transmission line.

BACKGROUND ART

Depolarization

When polarized light is sent through an optical fiber, it undergoes depolarization. This happens both in the case of classical light as well as non-classical light, such as (but not limited to) squeezed states or single photons. Depolarization leads to limitations in communication applications, both in present day optical communication and also in future quantum communication. Reducing depolarization is an important task.

It is important to mention that for some applications it is enough to be able to maintain polarization only along one single basis (such as horizontal and vertical linear polarization, or right and left circular polarization). In other applications, such as those envisaged in quantum communication, it is important to be able to maintain polarization along all directions on the Bloch sphere; this is a far more demanding task.

There are several reasons why light undergoes depolarization while propagating through a fiber. First of all, the polarization may fluctuate randomly due to interactions with the environment. For instance defects in the fiber can induce random polarization rotations and random polarization losses. One can think of this as entanglement (in the quantum mechanical sense) of polarization and the environment.

Secondly, polarization will undergo rotation while propagating through the fiber. The rotation will, in general, be different for different frequencies, because different frequencies couple differently to polarization. This phenomenon is called Polarization Mode Dispersion (PMD). It can be thought of as entanglement (in the quantum mechanical sense) of polarization and frequency.

Signal Distortion by Polarization Mode Dispersion

While propagating through an optical fiber, an optical pulse changes shape, typically increasing its length. This is an extremely important effect since it can limit considerably the bit rate for classical communication over long fibers: pulses cannot be sent too close to each other but must be kept separated so that they do not overlap when they get distorted. There are many reasons why optical pulses get distorted during propagation through optical fibers. One of them is the polarization mode dispersion as discussed in the previous section. This effect has been studied for instance in [1] [2]. Limiting such distortion is of major importance in optical communication.

Methods for Correcting for Depolarization

There are a number of methods for limiting PMD. We refer to [3] for a recent review of these methods.

One way is to reduce as much as possible asymmetries and stresses in the fiber as it is drawn, thereby reducing the birefringence of the fiber.

Another method is based on spinning the fiber while it is being drawn [4][5]. This method was further studied, among other articles, in [6][7][8][9]. In particular in [6] different spinning profiles were compared, including constant spin, sinusoidal spin, Frequency Modulated spin, and Amplitude Modulated spin. This method does not reduce birefringence in the fiber, but rotates along the fiber the birefringence inducing defects. This reduces the overall effects of the birefringence defects on the polarization by essentially averaging out effects of the different birefringent regions of the fiber. However spinning cannot reduce PMD that arises due to circular birefringence, and it cannot reduce PMD which arises after fabrication, for instance due to stresses (twisting, bending) which occur during deployment.

Methods which attempt to overcome quantum noise in optical fibers are known from [12] and [13]. These publications suggest using phase-shifters and/or beam splitters to reduce the effects of noise (including changes in polarization direction) which occur in quantum communications systems. However, they address neither the problem of depolarization due to polarization mode dispersion, nor pulse spreading due to PMD.

Accordingly there is a need for improved methods for reducing depolarization in a transmission line, especially where such depolarization arises as a result of PMD. There is also a need for improved methods for reducing pulse spreading due to polarization mode dispersion. Embodiments of the present invention address one or more of these problems.

DISCLOSURE OF THE INVENTION

Accordingly, the present invention provides a method for reducing spreading of a pulse in a transmission line, said spreading being as a result of polarization mode dispersion, comprising inducing predetermined polarization rotations of particle or wave components of the pulse in the transmission line.

In a further aspect, the present invention provides a transmission line comprising one or more birefringent regions, wherein the birefringent regions are arranged to induce predetermined polarization rotations of particle or wave components of a pulse carried by the transmission line, such that spreading of the pulse due to polarization mode dispersion is suppressed.

In a further aspect, the present invention provides a communication system comprising a transmission line as defined above.

In a further aspect, the present invention provides a method for manufacturing a transmission line, comprising forming one or more birefringent regions in the transmission line, wherein the birefringent regions are formed such that when a pulse is carried by the transmission line, the birefringent regions induce predetermined polarization rotations of particle or wave components of the pulse, such that spreading of the pulse due to polarization mode dispersion is suppressed.

In a further aspect, the present invention provides a method for reducing depolarisation of a signal in a transmission line, comprising inducing predetermined rotations of polarization states of the signal about two or more axes.

In a further aspect, the present invention provides a method for reducing depolarisation of a classical signal in a transmission line, comprising inducing predetermined rotations of polarization states of the signal.

In a further aspect, the present invention provides a method for reducing depolarisation of a signal in a transmission line, comprising inducing a sequence of predetermined rotations of polarization states of the signal, such that polarization mode dispersion of the signal induced by individual polarization rotations is partially or completely corrected by the overall sequence of polarization rotations in the transmission line.

In a further aspect, the present invention provides a method for reducing depolarisation of a signal in a transmission line, comprising continuously inducing predetermined rotations of polarization states of the signal along the transmission line.

In a further aspect, the present invention provides a method for reducing depolarization of photons in an optical fiber, comprising introducing polarization flip regions at regular intervals in the fiber.

In a further aspect, the present invention provides a method for determining locations for a sequence of birefringent regions in a transmission line, comprising selecting a length of the sequence such that over the length of the sequence, any unknown polarisation rotating interaction present in the transmission line does not significantly modify a polarisation state of particle or wave components of a pulse carried by the transmission line.

In a further aspect, the present invention provides a method for determining locations for a sequence of birefringent regions in a transmission line, comprising selecting a length of the sequence such that any unknown polarisation rotating interaction present in the transmission line does not significantly change over the length of the sequence.

The present invention provides a simple method by which depolarization of a signal can be reduced, in particular where the depolarization arises as a result of polarization mode dispersion. Embodiments of the present invention are also capable of reducing pulse spreading due to PMD. The method involves the use of birefringent regions in a transmission line which induce controlled polarization rotations, resulting in an effective reversal of the polarization changes induced by PMD. The methods are applicable to both to classical and quantum communication methods.

BRIEF DESCRIPTION OF DRAWINGS

FIG. 6 shows the application of pressure to a fiber via drops placed periodically on the fiber at different angles.

DETAILED DESCRIPTION OF THE INVENTION

Figure 1:
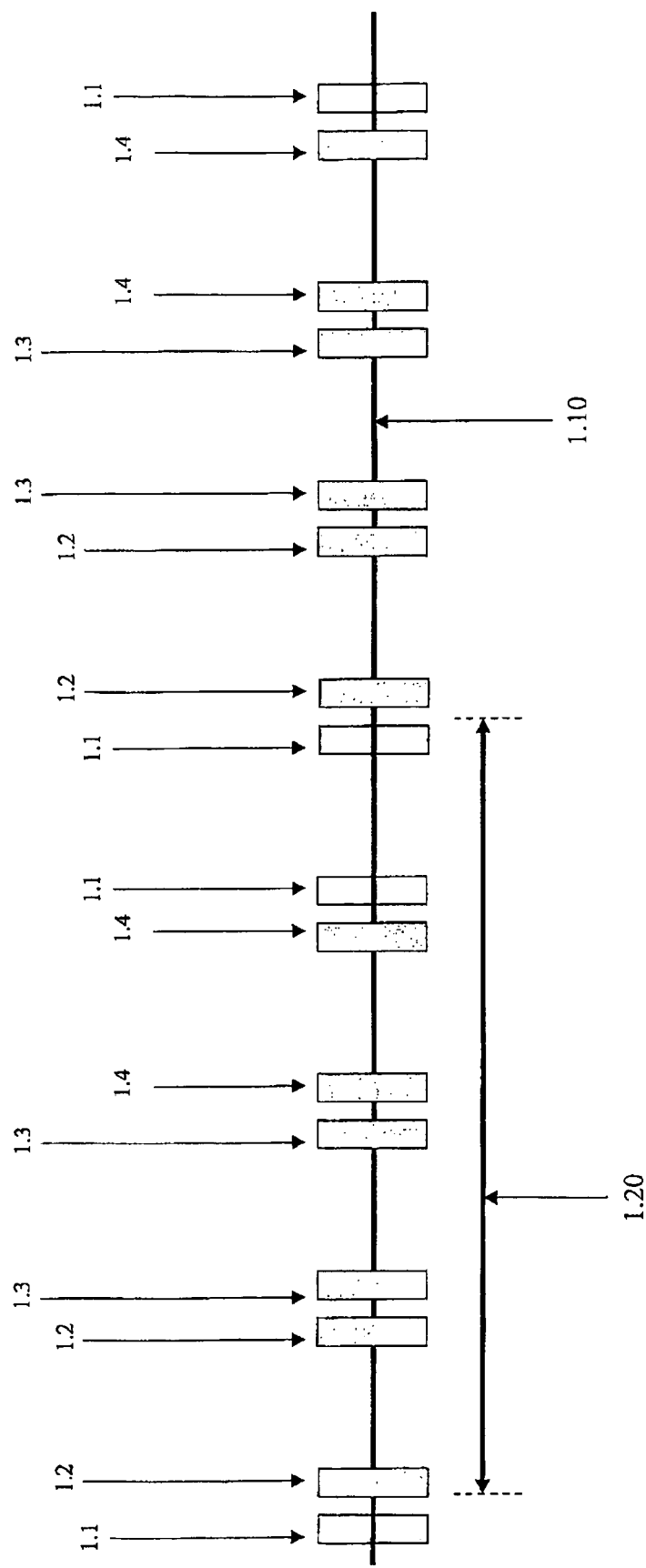
FIG. 1 shows an optical fiber interrupted by a first sequence of polarization flip devices.

1. Relationship Between PMD Correction and NMR Methods

Correction of PMD

The present invention is based on the recognition that PMD in communication systems can be corrected by methods analogous to the spin-echo method of Nuclear Magnetic Resonance (NMR). This recognition itself is founded on some fundamental principles concerning the nature of PMD.

As pointed out above, depolarization of a pulse may occur (1) due to random fluctuations due to interaction with the environment or (2) due to PMD. The first effect is an error (in the quantum mechanical language) since the polarization gets entangled with an environmental degree of freedom to which one has no access. The second effect is not, strictly speaking an error. Rather, it is a well-defined unitary evolution, describing the interaction between two degrees of freedom of the photon. Since no information is lost to the environment, this effect could, in principle, be corrected by some device, (placed for example at the output of the fiber) that implements an interaction between frequency and polarisation so as to compensate the different rotations that took place in the fiber. However, in general such a device is difficult to make.

The difficulty of correcting PMD is compounded by two effects. First of all, the coupling of polarization to frequency changes randomly over distances which are typically a few meters to a few tens of meters. Thus the overall evolution over long distances (many kilometers) results in extremely complicated correlations of polarization and frequency (especially for short pulses which are composed by many different frequencies). Second, the coupling of frequency and polarization changes over time due to changes in temperature and mechanical stress. (The time scale for these changes is typically slow compared to the time of propagation of the light through the fiber). Thus any compensating device needs to be extremely complicated and change over time.

Correlation with Spin-Echo Methods of NMR

Here we present a method, inspired by the spin-echo methods of NMR, to reduce depolarisation and pulse distortion that result from PMD in communication systems. The basic idea of the method is to introduce along the communication line sequences of controlled polarisation rotations. These polarisation rotations can either occur at discrete locations along the communication line, or act continuously along the communication line, or a combination of both discrete and continuous.

The origin of this method is in the pulse sequences (called spin-echo techniques) that have been developed in NMR to eliminate the dephasing which arises due to inhomogeneities of the magnetic field [11]. This inspired Viola and Lloyd to develop methods, called "bang-bang" decoupling, to supress decoherence of a quantum two level system interacting with an environment through the use of a suitable time dependent control Hamiltonian[14]. Wu Lo and Lidar [12] and Wu and Lidar [13] applied this to overcoming noise in optical fibers by implementing bang-bang control in space—along the fiber—rather than in time, but did not address the issue of polarization mode dispersion and pulse spreading.

Applying NMR Methods to Transmission of Light Through Optical Fibers

As mentioned above the method we present here to reduce PMD in communication systems is inspired by the spin-echo method of NMR. The fundamental reason why this method devised to deal with atomic nuclei and the magnetic fields surrounding them could be at any relevance at all for photons propagating through optical fibers is that any two quantum systems that are described by Hilbert spaces of the same dimension (in our case spin ½ nuclei and polarization of photons) can be formally (i.e. mathematically) mapped one onto the other; the same mathematics applies to both.

However, to realize that these methods can be applied to PMD in communication systems, and in particular to light propagation through optical fibers requires several conceptual breakthroughs.

1. At first sight, one would think that the methods for spin cannot—realisticaly—apply to light propagation in optical fibers because when the photon interacts with, say, an impurity in the fiber, the interaction takes place in an extremely short time—while the photon flies by—and during, this time there is no way to make all the polarization rotations required. The key here is to realize that in the fiber there is also the issue of gradual polarisation rotations, and in particular the gradual frequency-polarization interaction. This interaction takes a much longer time. In fact, residual birefringence in today's fibers is rather small, which means that during propagation through many meters of fiber the unitary evolution due to frequency-polarization interaction is very close to identity, so one can perform the correction rotations.

2. Second, the idea of the spin echo, and of other error correction methods in general, is supposed to apply when the system we are interested in interacts with an environment out of our control—such as an unknown external magnetic field in the generalized spin echo example, or a photon and the optical fiber in the case of [12] and [13]. In, all these cases information is lost from the system. On the other hand, in the case of polarization mode dispersion the interaction is not between the photon's polarization and the environment, but between two of the photons own degrees of freedom—its polarization and its frequency. Hence, there is in principle no loss of information—all the information stays in the photon and is available to us. However, because it is difficult to actually determine the parameters entering the polarization-frequency interaction Hamiltonian, and also to use this knowledge in an effective way to construct a device that implements the reverse unitary transformation, we suggest to simply ignore this information, that is, treat the (in principle) known interaction between polarization and frequency as an interaction between polarization and an unknown environment! In other words, the frequency degrees of freedom, which are internal degrees of freedom belonging to the photon itself, can be treated as environmental (i.e. external) degrees of freedom.

One should also note a further element that strongly differentiates interactions between a true environment and polarization from the interactions between frequency and polarization and makes it difficult to imagine that methods devised to deal with true environments can work for the pseudo-environment consisting of the frequency degree of freedom. Frequency is a degree of freedom of the photon itself and as such it is carried by the photon wherever the photon goes. Information transferred from polarization to frequency follows the photon at all time and is not left at the location where the transfer occurred, or propagate from there independently from the photon as would be the case with a true interaction with an environment. The consequences of this can be seen dramatically in the fact that the error filtration method for correcting depolarization described in [15] does not work for PMD (when all the fibers used for multiplexing have identical PMD). The error filtration method cannot filter out depolarizations due to the well-defined interaction between the polarization and frequency because there is no record left in the different fibers: Whenever the photon emerges from the interferometer used in this method, the information is lost about which arm of the interferometer the depolarization error occurred.

Features of the Present Method

The method is particularly suited for reducing depolarisation and pulse distortion resulting from PMD in optical fibers. We emphasize however that it can also be used to decrease depolarisation and pulse distortion resulting from PMD in other communication systems, such as electrons propagating in electric wires, holes propagating in semiconductor electrical wires, etc. In particular the method does not rely on the fact that the transmitted particles are bosons or fermions.

By reducing depolarization, our method automatically reduces the distortion of pulses due to PMD. This will be the case both in the linear and non linear regime (as illustrated in [10]).

A basic feature of our method is that, in the case of light signals, our method applies both to quantum signals, such as single photon states, squeezed states etc. as well as to classical signals (i.e. classical light). This is due to the fact that we use only linear optical elements.

A major issue concerning implementation is that the compensating actions (polarization rotations) that we need in order to reduce depolarization and pulse distortion are implemented via interactions that introduce PMD by themselves. This might limit the frequency of the compensating interactions and ultimately the efficiency of the method. We present here a method by which the polarization rotations are implemented by sequences of interactions that "self-compensate", i.e. they are arranged in such a way as to correct the PMD that each one individually introduces.

We also suggest a number of methods to implement these polarisation rotations in practice, either during or after manufacture of optical fibers.

In the following, we present in section 2 the basic principles of our method, using the language of a spin ½ particle precessing in an unknown magnetic field. To this end we consider a specific example.

In section 3 we generalise the results of section 2. We introduce the notions of Exactly Compensating Sequences and Partially Compensating Sequences, both in the case of discreet, ie. effectively instantaneous, control operations, and in the case of continuous control operations.

In section 4 we discuss how to map these results to photons propagating in optical fibers, and address the specific issues which arise in this case.

In section 5 we address the fact that in general the control elements used in our method will themselves induce PMD because their effect will depend slightly on the frequency. We show that one can compensate for this effect by devising the sequence of control operations such that the PMD of the control operations cancels in first order. We call such sequences Self-Correcting Sequences.

In section 7 we discuss specific ways in which the control elements can be implemented in optical fibers.

2. Basic Principles of the Method 2.1. Basic Principle

The theoretical foundation of the method is quite simple, and it is inspired by techniques ("generalized spin echo") used in nuclear magnetic resonance (NMR) [11]. We will first describe our technique in the NMR language and then we will convert the description to optics.

Consider a spin ½ particle in a magnetic field. The Hamiltonian is $$H = \vec{B} \cdot \vec{\sigma} = B_x\sigma_x + B_y\sigma_y + B_z\sigma_z. \qquad (1)$$

The time evolution due to the interaction is given by the unitary operator $$U(\tau) = e^{-i\vec{B}\cdot\vec{\sigma}t}. \qquad (2)$$

Here $\vec{\sigma}$ are the Pauli matrices, ie. they are the three 2×2 traceless hermitian matrices that obey $\sigma_x\sigma_y = i\sigma_z$ and cyclic permutations.

Suppose we do not know the value of $\vec{B}$. Can we compensate for the evolution—in the spirit of the spin echo—so that after compensation the spin is left in its initial state? The following procedure accomplishes this.

The procedure consists of four basic steps that are then repeated.

Step 1. We let the system evolve for a time $\tau$. The time $\tau$ is taken short enough such that $\vec{B}\vec{\sigma}\tau \ll 1$ $$\left(\text{or equivalently } \tau \ll \frac{1}{|\vec{B}|}\right)$$

and the time evolution can be well approximated by the first-order approximation:

$$U(\tau) \approx 1 - i\vec{B}\vec{\sigma}\tau = 1 - i\tau(B_x\sigma_x + B_y\sigma_y + B_z\sigma_z). \quad (3)$$

Step 2. We interrupt the evolution by flipping the spin around the x axis. We then leave it evolve for a new period $\tau$ and finally we flip again the spin around the x axis. The actions in step two are described by $\sigma_x U(\tau)\sigma_x$ where $\sigma_x$ describes the flip around the x axis. Since $$\sigma_x \sigma_x \sigma_x = \sigma_x \quad (4)$$

$$\sigma_x \sigma_y \sigma_x = -\sigma_y \quad (5)$$

$$\sigma_x \sigma_z \sigma_x = -\sigma_z \quad (6)$$

we obtain, by expanding $U(\tau)$ to first order, $$\sigma_x U(\tau)\sigma_x \approx \sigma_x(1 - i\vec{B}\vec{\sigma}\tau)\sigma_x = 1 - i\tau(B_x\sigma_x - B_y\sigma_y - B_z\sigma_z) \quad (7)$$

which effectively compensates the evolution due to the $B_y$ and $B_z$ components. The evolution due to the $B_x$ component is not yet compensated; this will be accomplished during the next two steps.

Step 3. The same as Step 2, but the spin is flipped around the y axis. Step 3 is thus described by $\sigma_y U(\tau)\sigma_y$. Given that $$\sigma_y \sigma_x \sigma_y = -\sigma_x \quad (8)$$

$$\sigma_y \sigma_y \sigma_y = \sigma_y \quad (9)$$

$$\sigma_y \sigma_z \sigma_y = -\sigma_z \quad (10)$$

we obtain, by expanding $U(\tau)$ to first order, $$\sigma_y U(\tau)\sigma_y \approx \sigma_y(1 - i\vec{B}\vec{\sigma}\tau)\sigma_y = 1 - i\tau(-B_x\sigma_x + B_y\sigma_y - B_z\sigma_z) \quad (11)$$

Step 4. The same as Step 2, but the spin is flipped around the z axis. Step 3 is thus described by $\sigma_z U(\tau)\sigma_z$. Given that $$\sigma_z \sigma_x \sigma_z = -\sigma_x \quad (12)$$

$$\sigma_z \sigma_y \sigma_z = -\sigma_y \quad (13)$$

$$\sigma_z \sigma_z \sigma_z = -\sigma_z \quad (14)$$

we obtain, by expanding $U(\tau)$ to first order, $$\sigma_z U(\tau)\sigma_z \approx \sigma_z(1 - i\vec{B}\vec{\sigma}\tau)\sigma_z = 1 - i\tau(-B_x\sigma_x - B_y\sigma_y + B_z\sigma_z) \quad (15)$$

Putting all together, the time evolution over the four steps is $$U = \sigma_z U(\tau)\sigma_z \sigma_y U(\tau)\sigma_y \sigma_x U(\tau)\sigma_x U(\tau) \quad (16)$$

which, to first order yields $$U \approx 1 - i\tau(B_x\sigma_x + B_y\sigma_y + B_z\sigma_z + B_x\sigma_x - B_y\sigma_y - B_z\sigma_z + -B_x\sigma_x + B_y\sigma_y - B_z\sigma_z - B_x\sigma_x - B_y\sigma_y + B_z\sigma_z) = 1 + O(|B|^2\tau^2) \quad (17)$$

where $|B|^2 = B_x^2 + B_y^2 + B_z^2$. This shows that the evolution is effectively stopped (i.e. the overall time evolution, after the entire time period of $4\tau$ is approximately the identity). The procedure is then repeated again and again.

What happens if we change $\tau$, and for instance make it shorter? To compare different values of $\tau$, we need to compare the evolution, not over a time $\tau$ (which is variable), but over a fixed time T. For simplicity we take T to be an integer multiple of $\tau$. Then the evolution after time T is obtained by taking the product of eq. (17) T/$\tau$ times. One obtains $$U(T) = (1 + O(|B|^2\tau^2))^{T/\tau} = 1 + O(|B|^2 T\tau). \quad (18)$$

Thus the effect of the control sequence is better and better if $\tau$ is taken smaller and smaller.

The method relies on the fact that the interaction, although unknown to us, is constant in time (at least for the short times $\tau$ we are considering here). The unknown Hamiltonian that is responsible for the rotation of the spin in the first place is there all the time and affects the spin after the x, y and z rotations, and brings it back to the initial state.

2.2. Time Dependent Hamiltonian

In the above subsection we considered the unknown Hamiltonian to be time independent. It is essential for applications that our method works even if the Hamiltonian is time dependent, if the compensating rotations are performed after a time $\tau$ short enough so that the hamiltonian doesn't change substantially during this time.

Indeed, suppose that $\vec{B}$ is a function of time, $\vec{B}(t)$ In this case equation (3) will contain a second-order term $i\partial_t \vec{B}(0) \vec{\sigma}\tau^2$ that comes from the Taylor expansion $$\vec{B}(t) = \vec{B}(0) + t\partial_t \vec{B}(0) + O(t^2). \quad (19)$$

In order for this term to be negligible compared to the first order term the following condition must be obeyed $$\partial_t \vec{B} \vec{\sigma}\tau^2 < \vec{B}\vec{\sigma}\tau \quad (20)$$

which can be reexpressed as $$\tau < \frac{|\vec{B}|}{|\partial_t \vec{B}|}. \quad (21)$$

That is the method will work well for time dependent magnetic fields if $\tau$ is smaller than the rate of change of the magnetic field.

2.3. Operator Valued Magnetic Fields

The method works equally well when $B_x$, $B_y$ and $B_z$ are not real numbers as above, but quantum (possibly non-commuting) operators—the same mathematics applies. Hence, in the first order of perturbation, the above method works for the most general spin ½ Hamiltonian.

$$H = \vec{\hat{B}}(t)\vec{\sigma} = B\hat{B}_x(t)\sigma_x + \hat{B}_y(t)\sigma_y + \hat{B}_z(t)\sigma_z, \quad (22)$$

where $\hat{B}_x(t)$, $\hat{B}_y(t)$ and $\hat{B}_z(t)$ are arbitrary operators. This means that in the first order of perturbation we can exactly compensate for the effect of the interaction of the spin with any other quantum system.

The time scales for the validity of the first order perturbation are obtained by generalizing the discussion in the above subsections. There are two conditions on $\tau$ for the first order approximation to be valid:

1) First of all τ should be such that in the absence of the compensating sequence—the unknown operator valued magnetic field cannot significantly modify the state of a spin in time τ.

In other words the unknown operator valued magnetic field modifies the state of spins, for instance by rotating them, depolarising them, etc. . . . This modification of the state of spins is not instantaneous, but takes a characteristic time. τ should be less than this characteristic time. Mathematically we can express this as $$\tau < \frac{1}{\|\vec{B}\|} \tag{23}$$

where by $\|\vec{B}\|$ we mean a suitable operator norm, such as $$\|\vec{B}\| = \sqrt{Tr[\vec{B}^\dagger \cdot \vec{B}\rho]} = \sqrt{Tr[(\vec{B}_x^\dagger \vec{B}_x + \vec{B}_y^\dagger \vec{B}_y + \vec{B}_z^\dagger \vec{B}_z)\rho]} \tag{23B}$$

where ρ represents the state all the degrees of freedom that enter in $\vec{B}$.

2) τ should be such that the unknown operator valued magnetic field does not change significantly in time τ. Mathematically this can be expressed as $$\tau < \frac{\|\vec{B}\|}{\|\partial_t \vec{B}\|}, \tag{24}$$

where $\|.\|$ is a suitable operator norm, for instance the same as in eq. (23B). For the rest of this paper equations (23), (24) and their fiber equivalents described later, define the validity of "first order perturbation".

Of course, here we consider that the exact value of $\vec{B}$ is unknown—indeed, the main issue under investigation here is compensating for an unknown magnetic field. However, for determining the time scale (i.e. for determining the time scale of the "first order regime") we don't need to know the exact values of the field but it is enough to have estimates on its magnitude and rate of change. These estimates can be determined experimentally by studying the time evolution of spins in the magnetic field.

Note that we expect that even when eqs. (23) and (24) are not obeyed, the effects of $\vec{B}$ will be reduced, even thought the effect may be small.

On the other hand it can be shown that when eqs. (23) and (24) are obeyed, the smaller τ, the more the effects of the unknown magnetic field $\vec{B}$ are reduced, see discussion around eq. (18). Thus one should always try to take τ as small as possible.

3. Generalisations of the Basic Method 3.1. Exactly Compensating Sequences

The sequence of operations described in section 2 is not unique. There are many different sequences of spin flips that succeed to the first order of approximation to exactly compensate for the effects of a constant unknown magnetic field. We call such a sequence an "exactly compensating sequence" (ECS).

A simpler form of the sequence (16) is possible. Indeed, since $$\sigma_y \sigma_x = i\sigma_z \tag{25}$$

$$\sigma_z \sigma_y = i\sigma_x \tag{26}$$

the sequence $$U = \sigma_z U(\tau) \sigma_x U(\tau) \sigma_z U(\tau) \sigma_x U(\tau) \tag{27}$$

has exactly the same effect as the sequence (16).

A general sequence consists of k equal time evolutions, each followed by a rotation:

$$U = R_k U(\tau) R_{k-1} U(\tau) \ldots R_2 U(\tau) R_1 U(\tau) \tag{28}$$

where $R_i$ represents a particular spin rotation. To see that this is the most general form, note that even if after each time interval there are more rotations performed one after the other, we can describe their total effect by a single total rotation (such as in the example of the sequences (16) and (27)). Note also that by considering only equal time evolutions between the rotations we do not limit the scope of the method. Indeed, a longer period of uninterrupted evolution can be considered as two periods of evolution interrupted by a trivial rotation (i.e. R=I); since some of the rotations $R_i$ in (28) could be taken to be equal to the identity, our method is completely general.

By denoting $$\tilde{R}_0 = I \tag{29}$$

$$\tilde{R}_i = R_i R_{i-1} \ldots R_1 \tag{30}$$

for $1 \leq i \leq k$ we can write (28) as $$U = \tilde{R}_k \tilde{R}_{k-1}^\dagger U(\tau) \tilde{R}_{k-1} \tilde{R}_{k-2}^\dagger U(\tau) \ldots \tilde{R}_2 \tilde{R}_1^\dagger U(\tau) \tilde{R}_1 \tilde{R}_0^\dagger U(\tau) \tilde{R}_0 \tag{31}$$

In first order approximation in τ we have $$U = \tilde{R}_k \left(1 - i\tau \vec{\hat{B}} \sum_{j=0}^{k-1} \tilde{R}_j^\dagger \vec{\sigma} \tilde{R}_j\right) \tag{32}$$

In order to be an ECS the sequence of rotations must obey the condition $$\sum_{j=0}^{k-1} \tilde{R}_j^\dagger \vec{\sigma} \tilde{R}_j = 0, \tag{33}$$

which is in fact a set of 3 conditions, one for each component of $\vec{\sigma}$.

Note that $\tilde{R}_k$ represents a known overall rotation of the spin at the end of the sequence. Some sequences are particularly simple, in the sense that $\tilde{R}_k = I$, i.e., the spin doesn't undergo any overall known rotation (such as the sequence discussed in subsection 2.1), but this is not a necessary condition for compensating the evolution to the unknown magnetic field in (22).

The condition (33) has a geometric interpretation. For each value of j, the three quantities, $\tilde{R}_j^\dagger \sigma_x \tilde{R}_j$, $\tilde{R}_j^\dagger \sigma_y \tilde{R}_j$, $\tilde{R}_j^\dagger \sigma_z \tilde{R}_j$, can be represented as 3 orthogonal vectors on the Bloch sphere. These 3 vectors realise thus an orthonormal frame which is obtained from the frame when j=0 by the rotation $R_j$. This implies that all the frames have the same chirality. To find an ECS we thus need to find a set of orthonormal frames of identical chirality such that the sums of the first, second and third vectors of the frames are all zero. From the rotation which, maps the frames one onto the other, one immediately finds the $\tilde{R}_j$ and then the $R_j$.

As we mentioned above, the most general sequence can be described by (28). However, each of the operators $R_j$ can be implemented in many different ways. An example is in the sequences (16) and (27) above, where a flip such as $\sigma_x$ could be implemented directly or by a flip around y followed immediately by a flip around z. Practical considerations will determine which particular implementation is better in each case.

We note that the conditions the sequence must obey are independent of the magnetic field $\vec{B}$. The only thing that $\vec{B}$ affects in the first order of perturbation are the conditions for the validity of the first order, that is the conditions on the total duration $k\tau$ of the sequence. This is true for all the sequences discussed in this paper.

3.2. Partially Compensating Sequences

In the previous section we discussed ECS, sequences that exactly compensate in the first order the effect of an unknown Hamiltonian. However in some embodiments it may not be necessary or practical to implement an ECS sequence. One reason is that there are always imprecisions in practically realizing a desired rotation, so some attempts to construct an ECS may not be perfectly successful. Another case is when we do not actually try to build an ECS because of limitations in what rotations we can practically realize. However even in such cases partial compensation can be obtained. Consider again eq (32) that describes the evolution under a general sequence of rotations. In order for the sequence to be exactly compensating it needs to fulfil the condition (33). On the other hand, had we done nothing, i.e. if all the rotations $R_j=I$ the first order disturbance of the spin would have been $$\sum_{j=0}^{k-1} \tilde{R}_j^\dagger \vec{\sigma} \tilde{R}_j = \sum_{j=0}^{k-1} \vec{\sigma} = k\vec{\sigma} \qquad (34)$$

In general the first order evolution can be written as $$\sum_{j=0}^{k-1} \tilde{R}_j^\dagger \sigma_i \tilde{R}_j = \lambda_i \sigma_{\xi_i} \qquad (35)$$

where $\sigma_{\xi_i}$ is the Pauli matrix describing the spin in some direction $\xi_i$ and the coefficients $\lambda_i$ are real and positive. The maximal value of each coefficient $\lambda_i$ is k, and it is obtained in the case when no compensation is attempted. If at least one of the coefficients $\lambda_i$ is smaller than k, then the sequence achieves partial compensation. We call such a sequence a "partially compensating sequence" (PCS).

3.3. Simple Spin Echo: a Simple Example of PCS

As an example of a PCS, we consider the simple spin echo. The sequence is given by $R_1=\sigma_x$ and $R_2=\sigma_x$. The corresponding $\tilde{R}_j$ are $\tilde{R}_0=I$, $\tilde{R}_1=\sigma_x$ and $\tilde{R}_2=I$. By inserting these values in (35) we find that $$\sum_{j=0}^{1} \tilde{R}_j^\dagger \sigma_x \tilde{R}_j = 2\sigma_x \qquad (36)$$

$$\sum_{j=0}^{1} \tilde{R}_j^\dagger \sigma_y \tilde{R}_j = 0 \qquad (37)$$

$$\sum_{j=0}^{1} \tilde{R}_j^\dagger \sigma_z \tilde{R}_j = 0 \qquad (38)$$

From (36), (37) and (38) we see this is a PCS.

This simple method works particularly well if the Hamiltonian is known not to contain any $\sigma_x$ interaction, i.e. when the Hamiltonian is of the form $$H=\hat{B}_y(t)\sigma_y+\hat{B}_z(t)\sigma_z, \qquad (39)$$

because then it completely cancels the Hamiltonian in first order.

Furthermore, in this simple situation, if it is also the case that the Hamiltonian is independent of t then we are not bound by first order perturbation, but can apply compensating rotations after any length of time.

Note that in an optical implementation, if the compensating rotations (polarization flips in this case) are realised alternatively by rotating the polarisation by $\pi$ in one direction and then in the other, i.e. if they are implemented by $\exp[+i\pi\sigma_x^{ph}]$ and then by $\exp[-i\pi\sigma_x^{ph}]$, then any PMD induced by the control element $\sigma_x^{ph}$ automatically cancels, see the discussion in section 5.1.

Note also that the above simplifications apply whenever the Hamiltonian has a simple form in any particular basis, i.e.

$$H=\hat{B}_1(t)\sigma_1+\hat{B}_2(t)\sigma_2 \qquad (40)$$

where 1 and 2 denote some orthogonal directions of the spin. In this case, one needs to perform flips around the third axis, i.e. $R_1=R_2=\sigma_3$.

3.4. Random Compensating Sequences

An interesting case is that of a completely random sequence, that is, one in which the rotations $R_i$ (and therefore also the rotations $\tilde{R}_i$) are chosen at random. In this case, $$\sum_{j=0}^{k-1} \tilde{R}_j^\dagger \sigma_i \tilde{R}_j$$

is a sum of k randomly rotated spin matrices. The result is a spin matrix oriented in some random direction $\xi_i$ and having magnitude of the order of $\sqrt{k}$, i.e.

$$\sum_{j=0}^{k-1} \tilde{R}_j^\dagger \sigma_i \tilde{R}_j \approx \sqrt{k}\,\sigma_{\xi_i}. \qquad (41)$$

Hence a random sequence of rotations is (with very high probability) a PCS.

3.5. Continuous ECS

In the above section we considered spin rotations that are effectively instantaneous, i.e. that they take place on a time scale much shorter than the time $\tau$ between the rotations. This allowed us to neglect the evolution due to the unknown interaction $\vec{B}$ during this time. On the other hand, one can also consider continuous compensating rotations.

The conditions for a continuous ECS turn out to be rather similar to those of the instantaneous ECS discussed above.

Consider the evolution under the total Hamiltonian $$H = H_D + H_c(t) \quad (42)$$

where $H_D$ represents the "dispersive" Hamiltonian $H_D = \vec{B} \cdot \vec{\sigma}$ that has to be corrected and $H_c(t)$ is the "control" (time dependent) Hamiltonian that describes the correction that we apply. (We neglect here the possible time dependence of $H_D$. The discussion of subsection 2.2 applies to the present subsection, as well as to all the rest of this work).

Consider now the evolution decomposed into a large number N of short time steps of duration $\tau$, with $N\tau = T$ fixed. At the end of the calculation we will take $\tau \to 0$.

$$U = (1 - iH_c(N\tau)\tau)(1 - iH_D\tau)(1 - iH_c((N-1)\tau)\tau) \ldots$$

$$\ldots (1 - iH_D\tau)(1 - iH_c(\tau)\tau)(1 - iH_D\tau)(1 - iH_c(0)\tau) \quad (43)$$

Let us define $$U_c(0) = I$$

$$U_c(k\tau) = (1 - iH_c(k\tau)\tau)(1 - iH_c((k-1)\tau)\tau) \ldots (1 - iH_c(\tau)\tau)(1 - iH_c(0)\tau). \quad (44)$$

The $U_c$ defined above in (44) is, of course, nothing else than the time evolution under the control hamiltonian alone. Noting that in first order $$U_c(k\tau)U_c^\dagger((k-1)\tau) = (1 - iH_c(k\tau)\tau) \quad (45)$$

we can write $$U = U_c(N\tau)U_c((N-1)\tau)^\dagger(1 - iH_D\tau)U_c((N-1)\tau)U_c((N-2)\tau)^\dagger \ldots U_c(\tau)U_c(0)^\dagger(1 - iH_D\tau)U_c(0) \quad (46)$$

Furthermore, denoting $\tilde{H}_D(k\tau) = U_c^\dagger(k\tau)H_D U_c(k\tau)$ we can write (46) as $$U(N\tau) = U_c(N\tau)\left(1 - i\tilde{H}_D((N-1)\tau)\tau\right)\left(1 - i\tilde{H}_D((N-2)\tau)\tau\right) \ldots \quad (47)$$

$$\ldots \left(1 - i\tilde{H}_D(\tau)\tau\right)\left(1 - i\tilde{H}_D(0)\tau\right)$$

$$\approx U_c(T)\left(1 - i\int_0^T \tilde{H}_D(t')dt'\right)$$

$$= U_c(T)\left(1 - i\int_0^T U_c^\dagger(t')H_D U_c(t')dt'\right)$$

where $T = N\tau$ is fixed, and we have taken the limit $\tau \to 0$, $N \to \infty$.

Since the dispersive hamiltonian $H_D$ is constant in time, we have $$U(T) = U_c(T)\left(1 - i\vec{B} \int_0^T U_c^\dagger(t')\vec{\sigma} U_c(t')dt'\right). \quad (48)$$

Thus, a time independent dispersive interaction can be corrected by a continuous control if $$\int_0^T U_c^\dagger(t')\sigma_i U_c(t')dt' = 0, \quad (49)$$

with $i = x, y, z$.

Note that, similarly to the sequences of instantaneous rotations eq. (32) the continuous compensating sequences can also result in a known rotation of the spin given by $U_c(T) = U_c(N\tau)$. The spin is left unchanged when $U_c(T) = U_c(N\tau) = I$.

As an example of Continuous ECS, consider the following time dependent control Hamiltonian $$H_c(t) = +c\sigma_x \text{ for } 0 \le t < \frac{\pi}{2c} \quad (50)$$

$$= +c\sigma_z \text{ for } \frac{\pi}{2c} \le t < \frac{2\pi}{2c}$$

$$= -c\sigma_x \text{ for } \frac{2\pi}{2c} \le t < \frac{3\pi}{2c}$$

$$= -c\sigma_z \text{ for } \frac{3\pi}{2c} \le t < \frac{4\pi}{2c}$$

$$= -c\sigma_x \text{ for } \frac{4\pi}{2c} \le t < \frac{5\pi}{2c}$$

$$= -c\sigma_z \text{ for } \frac{5\pi}{2c} \le t < \frac{6\pi}{2c}$$

$$= +c\sigma_x \text{ for } \frac{6\pi}{2c} \le t < \frac{7\pi}{2c}$$

$$= +c\sigma_z \text{ for } \frac{7\pi}{2c} \le t < \frac{8\pi}{2c}$$

where $c > 0$ determines the time $T = 4\pi/c$ after which the compensating sequence is finished. One can calculate that this sequence obeys the conditions eq. (49) for a Continuous ECS. (One also checks that it obeys the condition eq. (84) for first order compensation of the PMD of the control Hamiltonian itself, see section 5.1).

3.6. Continuous PCS

Similar to the case of sequences of instantaneous rotations, we can also have continuous partial compensating sequences.

For example, consider the time dependent control Hamiltonian $$H_c = \alpha(t)\sigma_z \quad (51)$$

The associated time evolution is $$U_c(t) = e^{-i\int_0^t \alpha(t')\sigma_z dt'}. \quad (52)$$

We thus obtain $$U_c(t)^\dagger \sigma_x U_c(t) = \cos\left[2\int_0^t \alpha(t')dt'\right]\sigma_x + \sin\left[2\int_0^t \alpha(t')dt'\right]\sigma_y \quad (53)$$

$$U_c(t)^\dagger \sigma_y U_c(t) = -\sin\left[2\int_0^t \alpha(t')dt'\right]\sigma_x + \cos\left[2\int_0^t \alpha(t')dt'\right]\sigma_y \quad (54)$$

$$U_c(t)^\dagger \sigma_z U_c(t) = \sigma_z \quad (55)$$

The effect of the dispersion generated by $B_x\sigma_x$ and $B_y\sigma_y$ vanishes if $$\int_0^T \cos\left[2\int_0^t \alpha(t')dt'\right] = 0 \quad (56)$$

and $$\int_0^T \sin\left[2\int_0^t \alpha(t')dt'\right] = 0 \quad (57)$$

while the effect of $B_z\sigma_z$ is not compensated by this control.

3.7. Compensating Sequences in the Presence of a Large Known Magnetic Field

A case which may be important in practice is when the Hamiltonian contains both a known magnetic field $B_K$ and an unknown magnetic field $B_U$. Of course we can still use the compensating sequences described above to compensate both $B_K$ and $B_U$. But this is problematic if the known magnetic field is much larger than the unknown one, since in order for the compensating sequences to work well one needs that the effects of both $B_K$ and $B_U$ be first order. Thus the compensating sequence will need to be applied very often.

The way round this is to incorporate $B_K$ into the compensating sequence. Thus in the presence of a control Hamiltonian, the total Hamiltonian is $$H = \vec{B}_U \cdot \vec{\sigma} + \vec{B}_K \cdot \vec{\sigma} + H_c(t) \tag{58}$$

which we rewrite as $$H = \vec{B}_U \cdot \vec{\sigma} + H'_c(t) \tag{59}$$

with $H'_c(t) = \vec{B}_K \cdot \vec{\sigma} + H_c(t)$ the effective control Hamiltonian. We now need to impose that $H'_c$ compensates for the unknown magnetic field $H_U$.

As an illustration of this method, suppose that $\vec{B}_K$ points in the z direction so that $\vec{B}_K \cdot \vec{\sigma} = B_K \sigma_z$. The following is an ECS:

1. Set $H_c$ to zero from time t=0 to t=$n\pi/B_K$. At time $n\pi/B_K$ the spin has precessed by exactly $2n\pi$.
2. At time t=$n\pi/B_K$ carry out an instantaneous $\sigma_x$ spin flip.
3. Set $H_c$ to zero from time t=$n\pi/B_K$ to t=$2n\pi/B_K$.
4. At time t=$2n\pi/B_K$ carry out an instantaneous $\sigma_x$ spin flip.

The integer n, and thus the time $2n\pi/B_K$ to carry out the sequence can be freely chosen.

3.8. Magnetic Fields with Different Time Scales

It may be that the magnetic field fluctuates along different axes with different time scales. For instance the component of $\vec{B}$ along the x and y axes may change rapidly, whereas the component along the z axis changes slowly. The CS can be adapted to these different time scales. For instance one can carry out the simple spin echo of subsection 3.3 at a rate corresponding to the fast time scale to compensate the components along x and y. There remains the component along z which can be compensated by much less frequent insertions of $\sigma_x$ operations.

4. Photons Propagating Through Optical Fibers

4.1. Correspondence with Spin

As noted in section 1 any two quantum systems that are described by Hilbert spaces of the same dimension (in our case spin ½ nuclei and polarization of photons) can be formally (i.e. mathematically) mapped one onto the other. (For further convenience we call the Hilbert space of polarization and that of spin the "polarization space".)

One possible mapping is the following: Let $|H\rangle$ denote horizontal polarization and $|V\rangle$ vertical polarization. The photon equivalent of $\uparrow_z$ (i.e. spin polarized "up" along the z axis) is $|H\rangle$ and the equivalent of $\downarrow_z$ (spin polarized "down" along the z axis) is $|V\rangle$. Furthermore, the equivalent of the spin operator $\sigma_z$ is a photon polarization operator $\sigma_z^{ph}$ defined by $$\sigma_z^{ph}|H\rangle = |H\rangle \tag{60}$$

$$\sigma_z^{ph}|V\rangle = -|V\rangle \tag{61}$$

while $\sigma_x^{ph}$ and $\sigma_y^{ph}$ are defined by $$\sigma_x^{ph}|H\rangle = |V\rangle \tag{62}$$

$$\sigma_x^{ph}|V\rangle = |H\rangle \tag{63}$$

and $$\sigma_y^{ph}|H\rangle = i|V\rangle \tag{64}$$

$$\sigma_y^{ph}|V\rangle = -i|H\rangle. \tag{65}$$

Note that the eigenstates of $\sigma_y^{ph}$ are left and right circular polarized states:

$$|R\rangle = \frac{1}{\sqrt{2}}(|H\rangle + i|V\rangle) \tag{66}$$

$$|L\rangle = \frac{1}{\sqrt{2}}(|H\rangle - i|V\rangle). \tag{67}$$

In other words, the y axis in the polarization space is the axis defined by the fact that rotations around it preserve the circular polarized light.

The "horizontal" and "vertical" directions are defined, according to usual optical convention as two orthogonal directions conventionally chosen; they need not be the actual horizontal and vertical. The "horizontal" and "vertical" axis need to be defined not only at a single point but at all points along the fiber. There are many (infinite) ways to do this, and it is again a matter of convention how we do it. However, the precise form of the Hamiltonian depends on the convention used to define the axis.

The most general interaction Hamiltonian affecting the polarization is $$H = \vec{\hat{B}}(l) \cdot \vec{\sigma}^{ph} = \hat{B}_x(l)\sigma_x^{ph} + \hat{B}_y(l)\sigma_y^{ph} + \hat{B}_z(l)\sigma_z^{ph}, \tag{68}$$

the formal equivalent of (22).

The operator $\hat{B}(l)$ contains all the information about all the other variables that affect the polarization, and through it one can also determine the effect that polarization has on the other degrees of freedom of the photon. We make this more explicit in the next subsection, where we use the standard optical formalism.

As we noted above, the precise form of the Hamiltonian depends on the convention used to define the linear polarization axis along the fiber. Indeed, even in a perfect fiber where polarization stays constant, polarization would appear to rotate if our definition of the axis rotates along the fiber. Changing from one convention to another has the effect of introducing a supplementary known (position dependent but frequency independent) field $\vec{B}_0(l)$ in the Hamiltonian. A convenient convention is to define the linear polarization axis along the fiber in such a way that any known frequency independent field $\vec{B}_0(l)$ is eliminated. We adopt this convention here.

We also note that optical fibers have losses, i.e. photons can be absorbed. This can simply be modeled by considering $\hat{B}$ to be non-hermitian. Furthermore note that in general a fiber contains both polarization independent and (a generally smaller) amount of polarization dependent absorption. The polarization independent absorption is not of interest for us here: since it commutes with all the operations that compose our compensating sequences it does not modify our method and its length scale at all. Hence we can simply ignore, the polarization independent absorption and include only the polarization dependent one.

4.2. The Detailed Structure of B: an Illustration

As we mentioned in the preceeding subsection, the operator $\hat{B}_0(l)$ contains all the information about all the degrees of freedom that affect the polarization. Here we illustrate this by analyzing the (very common) case of a fiber with negligible non-linearity. We emphasize however that, similar to the case of NMR, the compensating sequences are totally independent on the specific form of $\hat{B}_0(l)$; only the length scale for the validity of the first order approximation depends on $\hat{B}_0(l)$)—but in any case this quantity has to be determined experimentally. Therefore our method applies to any type of fiber, including fibers with high non-linearities.

In this subsection, to make connection with the usual fiber optics language, we derive our equations using classical physics, following [16]; the same equations then define the Heisenberg evolution of the quantum observables.

Consider a light pulse propagating along an fiber. The pulse is centered on frequency $\Omega$ and has wave number K; the distance along the fiber is denoted l. Its amplitude can be written as $$A(l,t)e^{-i\Omega t+iKl} \tag{69}$$

where A is the slowly varying envelope of the pulse. We introduce the variable $t'=t-l/v_g$ where $v_g$ is the group velocity of the pulse. If we neglect all polarisation effects A obeys an equation of the form $$i\partial_l A = -\beta_2 \partial_{t'}^2 A \tag{70}$$

where $\beta_2$ describes the dispersion. One can also include in this equation other effects describing for instance non linearities (giving rise to the Non Linear Schrödinger Equation), higher order dispersion, etc . . . .

Here we are interested in analyzing birefringence. We must then view A as a two component vector. Each component describes the amplitude of the pulse along one of two orthogonal polarisation components. We then obtain an equation of the form $$i\partial_l A = B_0 A + i\partial_{t'} B_1 A \tag{71}$$

where we have neglected terms with higher order derivatives in t' (they could easily be included, but the main effects can be seen from the above equation). Here $B_0$ and $B_1$ are matrices, which we take to be traceless. (The part of $B_0$ and $B_1$ proportional to the identity can be incorporated into the wave vector K and the average group velocity $v_g$).

Taking the Fourier transform we can rewrite eq. (71) as $$i\partial_l A(\omega) = B_0 A(\omega) + \omega B_1 A(\omega) \tag{72}$$

where $A(\omega)$ is the Fourier transform of $A(t)$ at frequency $\omega$. Since $B_0$ and $B_1$ are traceless 2×2 matrices, we can write them as $B_0 = \vec{B}_0 \cdot \vec{\sigma}^{ph}$ and $B_1 = \vec{B}_1 \cdot \vec{\sigma}^{ph}$. This equation has exactly the same form as the equation of evolution of spin in an unknown, operator valued, magnetic field, with $\vec{B} = \vec{B}_0 + \omega \vec{B}_1$ and the evolution parameter being the position along the fiber rather than time. Note that the magnetic field is operator valued since $\vec{B}_1$ is multiplied by the frequency $\omega$.

The birefringence thus induces both different phase velocities (through $B_0$) and different group velocities (through $B_1$). In most fibers the phase velocity difference and the group velocity difference are of the same order of magnitude. This implies that the order of magnitude of $B_1$ is $B_1 \square B_0/\Omega$.

In general the matrix $B_1$ need not be proportional to $B_0$. But in most cases we expect them to be almost proportional one to the other, since they originate from the same physical effect (for instance bending or twisting of the fiber). This will be used in subsection 5.

Equations (71) and (72) describe the evolution of the envelope of a classical pulse. Upon quantizing the Electro-Magnetic field, one will find that the Heisenberg equations for the field operator $\hat{A}(t)$ and its Fourier Transform $\hat{A}(\omega)$ are identical to eqs. (71) and (72).

4.3. Application of the Generalized Spin Echo Method to Polarisation

The "generalized spin echo" methods apply formally to the photon exactly as to a nuclear spin, under the mapping described above. As discussed above the most general interaction Hamiltonian affecting the polarization is $$H = \vec{B}(l) \cdot \vec{\sigma}^{ph} = \hat{B}_x(l)\sigma_x^{ph} + \hat{B}_y(l)\sigma_y^{ph} + \hat{B}_z(l)\sigma_z^{ph}, \tag{73}$$

the formal equivalent of (22). Here the equivalent of the time t in (22) is l, the location of the photon along the optical fiber.

Figure 2:
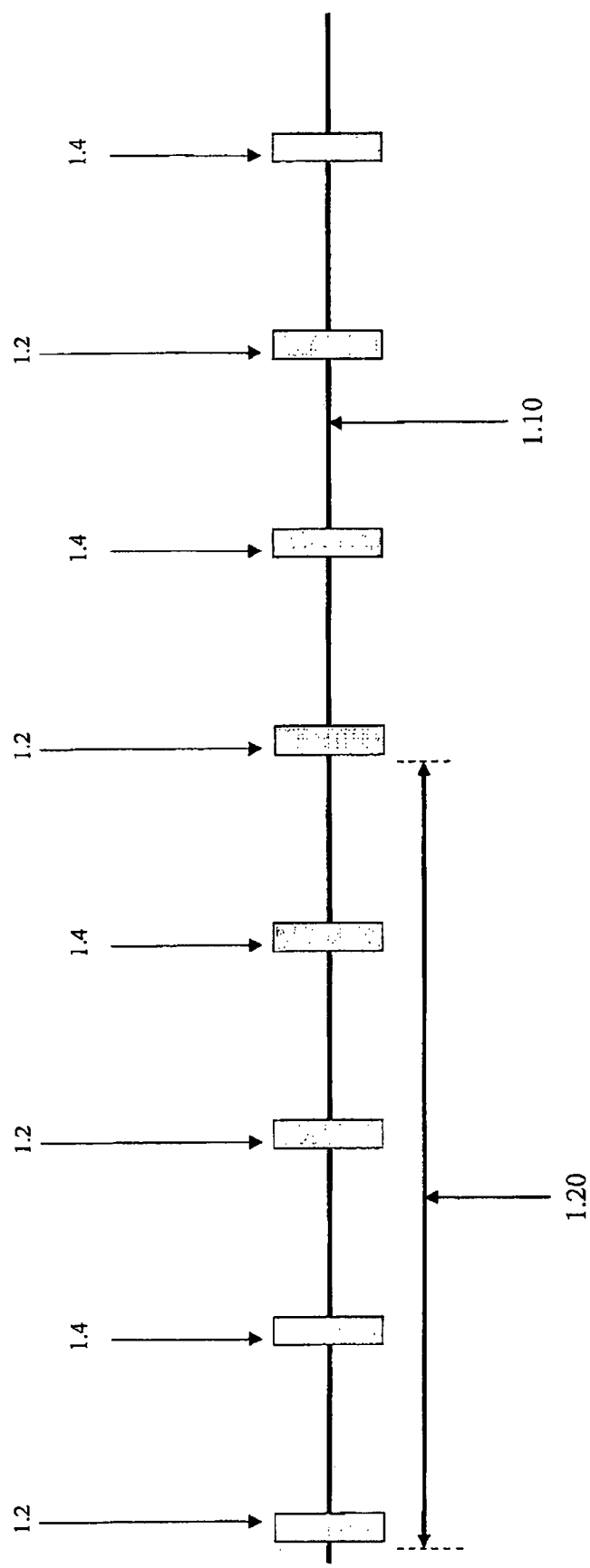
FIG. 2 shows an optical fiber interrupted by a second sequence of polarization flip devices.

In order to implement the formal equivalent of the sequences of rotations in polarization space described in section 2, i.e. in order to interrupt the evolution and make polarization rotations all we need to do is to insert from place to place in the fiber appropriate achromatic polarization rotation devices. As examples see FIG. 1 which corresponds to the method of eq. (16) and FIG. 2 which corresponds to the method of eq. (27). These figures represent an optical fiber (1.10) interrupted by polarization flip devices (1.2, 1.3, 1.4) which can be built into the fiber or independent of it. The number 1.2 corresponds to a $\sigma_z$ flip, 1.3 corresponds to a $\sigma_y$ flip, 1.4 corresponds to a $\sigma_x$ flip. The number 1.1, associated to the empty box, corresponds to the identity 1, ie. to no polarisation rotation taking place. A compensating sequence is denoted 1.20; in the case of FIG. 1 it contains $2\sigma_z$ flips, $2\sigma_y$ flips, $2\sigma_x$ flips, 2 identities 1; in the case of FIG. 2 it contains $2\sigma_z$ flips and $2\sigma_x$ flips.

One way to realise the polarisation flips is to cut the fiber in pieces and insert between two subsequent pieces the appropriate polarization rotation device. In alternative more preferred embodiments, the fiber is fabricated with polarization flip regions included at regular intervals. The polarization flip regions may be implemented, for example, by appropriately changing the chemical content, or the mechanical properties of the fiber material (see discussion in section 7).

In order to implement the equivalent of continuous spin rotations (subsections 3.5, 3.6) we need to act on the fiber continuously along its length.

We now reach a crucial point of our discussion. Until now we discussed the effects of our methods on polarisation. We emphasize here that when we reduce depolarisation we automatically reduce PMD, hence the spread of pulses due to PMD is also reduced. The reason that our method reduces both depolarisation and polarization mode dispersion is that it effectively averages the interaction Hamiltonian to zero, $$H = \vec{B}(l) \cdot \vec{\sigma}^{ph} \to 0 \tag{74}$$

(or significantly decreases it in magnitude).

Also note that, since the effect of any unknown $\vec{B}(l)$ can be compensated, the above described compensation procedures work in any type of fiber, including fibers with high nonlinearities.

4.4. Length Scales in the Case of Fibers

The length of fiber after which the polarization rotation devices must be placed is formally equivalent to the time interval after which the rotations on the spin should be implemented. In particular the analogues of conditions 23 and 24 for validity of first order perturbation become:

1) The length $l_{SEQ}$ of the compensating sequence should be such that—in the absence of the compensating sequence—the unknown operator valued polarisation interaction $\vec{\hat{B}}$ (see eq. (73)) cannot significantly modify the state of polarisation of light over distance $l_{SEQ}$ In other words the unknown operator valued field $\vec{\hat{B}}$ modifies the state of polarisation of light, for instance by rotating it, depolarising, it, etc . . . . This modification of the polarisation is not instantaneous, but takes a characteristic length. $l_{SEQ}$ should be less than this characteristic length. Mathematically we can express this as $$l_{SEQ} < \frac{1}{\|\vec{\hat{B}}\|} \quad (75)$$

where by $\|\vec{\hat{B}}\|$ we mean a suitable operator norm, such as $$\|\vec{\hat{B}}\| = \sqrt{Tr[\vec{\hat{B}}^\dagger \cdot \vec{\hat{B}} \rho]} = \sqrt{Tr[(\hat{B}_x^\dagger \hat{B}_x + \hat{B}_y^\dagger \hat{B}_y + \hat{B}_z^\dagger \hat{B}_z)\rho]} \quad (75B)$$

where $\rho$ represents the state all the degrees of freedom that enter in $\vec{\hat{B}}$.

2) The length $l_{SEQ}$ of the compensating sequence should be such that the unknown operator valued polarisation interaction $\vec{\hat{B}}$ does not change significantly over distance $l_{SEQ}$. Mathematically this can be expressed as $$l_{SEQ} < \frac{\|\vec{\hat{B}}\|}{\|\partial_l \vec{\hat{B}}\|}, \quad (76)$$

where $\|\cdot\|$ is a suitable operator norm, for instance the same as in eq. (75B).

As we noted before, compensation will occur even when the conditions for first order are not fulfilled; experiments will also tell how well the compensation works in this case. On the other hand it was shown previously that, even when conditions (75) and (76) are satisfied, the compensation will work better and better if $l_{SEQ}$ is made shorter and shorter.

For the case illustrated in subsection 4.2, we can further detail the conditions (75) and (76). We emphasize again however that ultimately the conditions should be determined experimentally.

First we note that the length $$L_B = \frac{2\pi}{|\vec{B}_0|}$$

is known as the beat length. It is the length after which the state of polarisation repeats itself. It can be readily measured using standard techniques.

The analogue of condition (75) is $$l_{SEQ} < L_B \quad (76B)$$

(if we suppose, which is generally the case, that $\omega|\vec{B}_1| \ll |\vec{B}_0|$).

[We note that it may happen in some cases that $\vec{B}_0$ is known, and one only wants to correct $\vec{B}_1$. In this case the techniques of section 3.7 can be used. And then the length scale must be modified and becomes $$l_{SEQ} < \frac{1}{\omega|\vec{B}_1|} \quad (76C)$$

where $\omega$ denotes the typical frequency spread of the pulse.]

Second note that the rate of change of $\vec{B}$ is known as the mode coupling length $L_{MCL}$, see for instance [3] for a definition. It can be measured using standard techniques, see for instance [1]. We expect the rate of change of $\vec{B}_0$ to be similar to the rate of change of $\vec{B}_1$. When this is the case the analogue of eq. (76) is $$l_{SEQ} < L_{MCL}. \quad (77)$$

If the rates of change of $\vec{B}_0$ is different from the rate of change of $\vec{B}_1$, then it is the smallest rate of change which determines the analogue of (76).

4.5. Observations

We would like draw attention to the fact that although above $\hat{B}_x(l)$, $\hat{B}_y(l)$ and $\hat{B}_z(l)$ were taken to be due to interactions with the frequency, our method automatically corrects for any sources of depolarization—indeed, all interactions of polarization with other physical systems can be described by (68). The only requirement is for the interaction to be "gradually changing", i.e. to be weak enough over the length of fiber l after which it is practical to insert the polarization rotation devices, so as to be in the first order of perturbation.

It is also important to mention that while making the polarization rotations at intervals which assure the application of first order perturbation is desirable, this doesn't mean that going outside this regime renders the method completely useless. On the opposite, the method can certainly be used. However the efficiency of the method is in general reduced; the precise results can easily be computed by simply taking into account more orders in eq (32), depending on the particular parameters of the Hamiltonian.

5. Self-Correcting Sequences

It is worthwhile to note that ordinary polarization rotation devices (such as ordinary $\lambda/2$ plates etc.) are not generally achromatic. This means that such devices may themselves entangle polarization with frequency and using them may result in depolarization even when the fiber is perfect. Of course, such devices could be used instead of the (preferred) achromatic ones as long as the depolarization due to the polarization rotation device is much smaller than the fiber-due depolarization that it helps correct.

However even if the PMD of the polarisation rotation devices is larger than the PMD it is supposed to correct, one can devise the sequence in such a way that—at least to first order—the PMD induced by the rotation devices cancel. We call such sequences "Self-Correcting Sequences" (SCS).

5.1. Examples Based on the Proportionality of $\vec{B}_0$ and $\vec{B}_1$

In this subsection we described SCS which exploit the fact that, when the model of section 4.2 is valid, $\vec{B}_0$ and $\vec{B}_1$ will in general be proportional one to the other, with $\omega \vec{B}_1$ much smaller than $\vec{B}_0$.

As illustration we consider the sequence eq. (27) consisting alternating $\sigma_x$ and $\sigma_z$ operations. Because of dispersion in the control elements, we suppose these control elements are implemented by operations of the form $$\sigma_x^{ph} e^{-i\beta\omega\sigma_x^{ph}} \Box \sigma_x^{ph}(1-i\beta\omega\sigma_x^{ph}) \tag{78}$$

and $$\sigma_z^{ph} e^{-i\beta\omega\sigma_z^{ph}} \Box \sigma_z^{ph}(1-i\beta\omega\sigma_z^{ph}) \tag{79}$$

where $\beta$ is equal to the ratio of $\vec{B}_1$ to $\vec{B}_0$ for the control elements. We suppose that $\beta\omega \ll 1$. We need to compute $$\sigma_z^{ph}(1-i\beta\omega\sigma_z^{ph})U(l)\sigma_x^{ph}(1-i\beta\omega\sigma_x^{ph})U(l) \times \times \sigma_z^{ph}(1-i\beta\omega\sigma_z^{ph})U(l)\sigma_x^{ph}(1-i\beta\omega\sigma_x^{ph})U(l) \tag{80}$$

to first order in $\beta\omega$ where $l$ is the distance between the control elements. We recall that $U(l) \Box 1-il\vec{B}\cdot\vec{\sigma}^{ph}$ can be expanded to first order in $l$. We already know that the terms of first order in $l$, zero'th order in $\beta\omega$ cancel. Let us now consider the terms of zero'th order in $l$, first order in $\beta\omega$. We obtain for these terms $$-i\beta\omega(\sigma_z^{ph}\sigma_z^{ph}\sigma_x^{ph}\sigma_z^{ph}\sigma_x^{ph}\sigma_x^{ph} + \sigma_z^{ph}\sigma_x^{ph}\sigma_x^{ph}\sigma_z^{ph}\sigma_x^{ph}\sigma_x^{ph} + \sigma_z^{ph}\sigma_x^{ph}\sigma_z^{ph}\sigma_z^{ph}\sigma_z^{ph}\sigma_x^{ph} + \sigma_z^{ph}\sigma_x^{ph}\sigma_z^{ph}\sigma_x^{ph}\sigma_z^{ph}\sigma_x^{ph}) \tag{81}$$

which vanishes. Thus we see that in this example the effect of PMD of the control optical elements cancels to first order.

We now derive a general condition for first order compensation of the chromatic effects produced by the control operations. We derive this for CCS.

Using the notation of subsection 3.5 (and in particular replacing length $l$ by time $t$), we write $$H = H_D + H_c(t) + \beta\omega H_c(t). \tag{82}$$

We want the first order terms in $\beta\omega$ to cancel. Define $$\tilde{H}_c(t) = U_c^\dagger(t) H_c(t) U_c(t) \tag{83}$$

where $U_c(t)$ is defined as the continuous limit of eq. 44. The condition for first order cancellation of the dispersion produced by the control operations themselves is (with T the duration of the sequence)

$$\int_0^T \tilde{H}_c(t) dt = 0. \tag{84}$$

5.2. General Method

We now give a second method to correct imperfections in the control Hamiltonian. As above we denote $H_c(t)$ the control Hamiltonian we wish to implement. We suppose that when implementing $H_c(t)$, we also implement an additional Hamiltonian $H_{ad}(t)$ which is unwanted. (In the example above $H_{ad} = \beta\omega H_c(t)$; here we do not require proportionality between $H_c$ and $H_{ad}$.) Thus we suppose that the total Hamiltonian is $$H = H_D + H_c(t) + H_{ad}(t).$$

Let us denote the unitary evolution engendered by $H_c$ by $U_c(t)$. More precisely it is given by the time ordered product:

$$U_c(t) = \tag{85}$$

$$\lim_{N\to\infty}\left(1 - i\frac{t}{N}H_c\left(\frac{(N-1)t}{N}\right)\right)\cdots\left(1 - i\frac{t}{N}H_c\left(\frac{t}{N}\right)\right)\left(1 - i\frac{t}{N}H_c(0)\right).$$

We will suppose that $H_c$ corrects Polarisation mode dispersion. For instance it could obey the equations $$\int_0^T dt\, U_c^\dagger(t)\vec{\sigma}U_c(t) = 0, \tag{86}$$

or could obey other conditions; the precise conditions do not matter here. Here T is the time it takes to implement the sequence The idea of the method is to implement first the evolution $U_c$, and then the inverse evolution $U_c^\dagger$. In this way any imperfections which arise during the evolution of $U_c$ will get undone during the inverse evolution. More precisely we will suppose that the total Hamiltonian takes the form $$H = H_D + H_c(t) + H_{ad}(t),\ 0 \le t \le T \tag{87}$$

$$= H_D - H_c(2T-t) - H_{ad}(2T-t),\ T \le t \le 2T.$$

The hypothesis that are required for the present method to work are thus that one can implement both $H_c$ and $-H_c$, and that when one implements $-H_c$, the unwanted additional Hamiltonian $H_{ad}$ also gets a minus sign. This, will generally be the case when the physical process which gives rise to $H_c$ also gives to $H_{ad}$. For instance in section 7 we suggest that $H_c = \sigma_x^{ph}$ can be implemented by squeezing the fiber in the vertical direction and that $H_c = -i\sigma_z^{ph}$ can be implemented by squeezing the fiber in the horizontal direction. We expect that in this case when $H_c$ changes sign, $H_{ad}$ will also change sign.

To see that the present method works, we proceed as follows. Denote by U the time ordered evolution for the total Hamiltonian H (i.e. it is the analogue of eq. (85), but with $H_c$ replaced by H). We then have:

1) To zero'th order in $H_D$ (that is if we set $H_D=0$), the relation $U(2T-t)=U(t)$ holds. In particular this implies that to order zero in $H_D$, $U(2T)=I$. In other words if the dispersive Hamiltonian $H_D$ is equal to zero, then after time 2T the effects of $H_c$ and of $H_{ad}$ have cancelled, independently of the details of $H_{ad}$.

2) Any conditions which we impose on $U_c$ will continue to be satisfied to zero'th order in $H_{ad}$ (that is if we set $H_{ad}=0$). For instance if the condition is of the form eq. (86), then to zero'th order in $H_{ad}$ it becomes:

$$\int_0^{2T} dt\, U_c^\dagger(t)\vec{\sigma}U_c(t) = \tag{88}$$

$$\int_0^T dt\, U_c^\dagger(t)\vec{\sigma}U_c(t) + \int_T^{2T} dt\, U_c^\dagger(2T-t)\vec{\sigma}U_c(2T-t) = 0.$$

In summary in the present method, the effect of $H_{ad}$ will only be felt in terms which are both first order in $H_D$ and first order in $H_c$. The advantage of this method is that it does not require any hypothesis to be made on $H_{ad}$, except that it will change sign when we change the sign of $H_c$.

6. Generalization to Other Systems

We note that the entire above discussion referred to depolarization of photons going through optical fibers. It must be clear however that identical procedures are effective in many other cases that are similar to this. Examples are depolarization of electron spin during the propagation of electrons through electric wires, or depolarization of the spin of holes through semiconductor wires. In particular applications emerging from recent advances in the fields of spintronics, mesoscopy and nanoelectronics might benefit from our method.

7. Preferred Implementations of Control Devices

Control elements of the form discussed above can of course be implemented by bulk optics, such as $\lambda/2$ plates. But this implies that the light must be coupled out of the fiber and then reinjected into the fiber. This is both costly and induces losses, but could be useful for specific applications.

The control elements (polarisation rotation devices) can be realized by modifying locally the fiber itself. Indeed, any birefringence produces polarization rotation. By inducing a controlled amount of birefringence along an appropriate axis, any polarization rotation can be implemented.

It is well known that birefringence can be induced by many effects, including

1. Inducing stress in the fiber
2. Applying pressure to the fiber
3. Bending the fiber
4. twisting the fiber
5. Inducing stresses by in-homogenous cooling during fabrication.
6. Anisotropy in the structure of the fiber itself, as in elliptic core fibers.

Any of these methods can be used to realize the control operations.

One preferred method is to induce permanent linear birefringence by inducing stresses in the fiber, for instance by deforming the fiber. This can be done either after the fiber has been drawn, or while it is being drawn.

Figure 3:
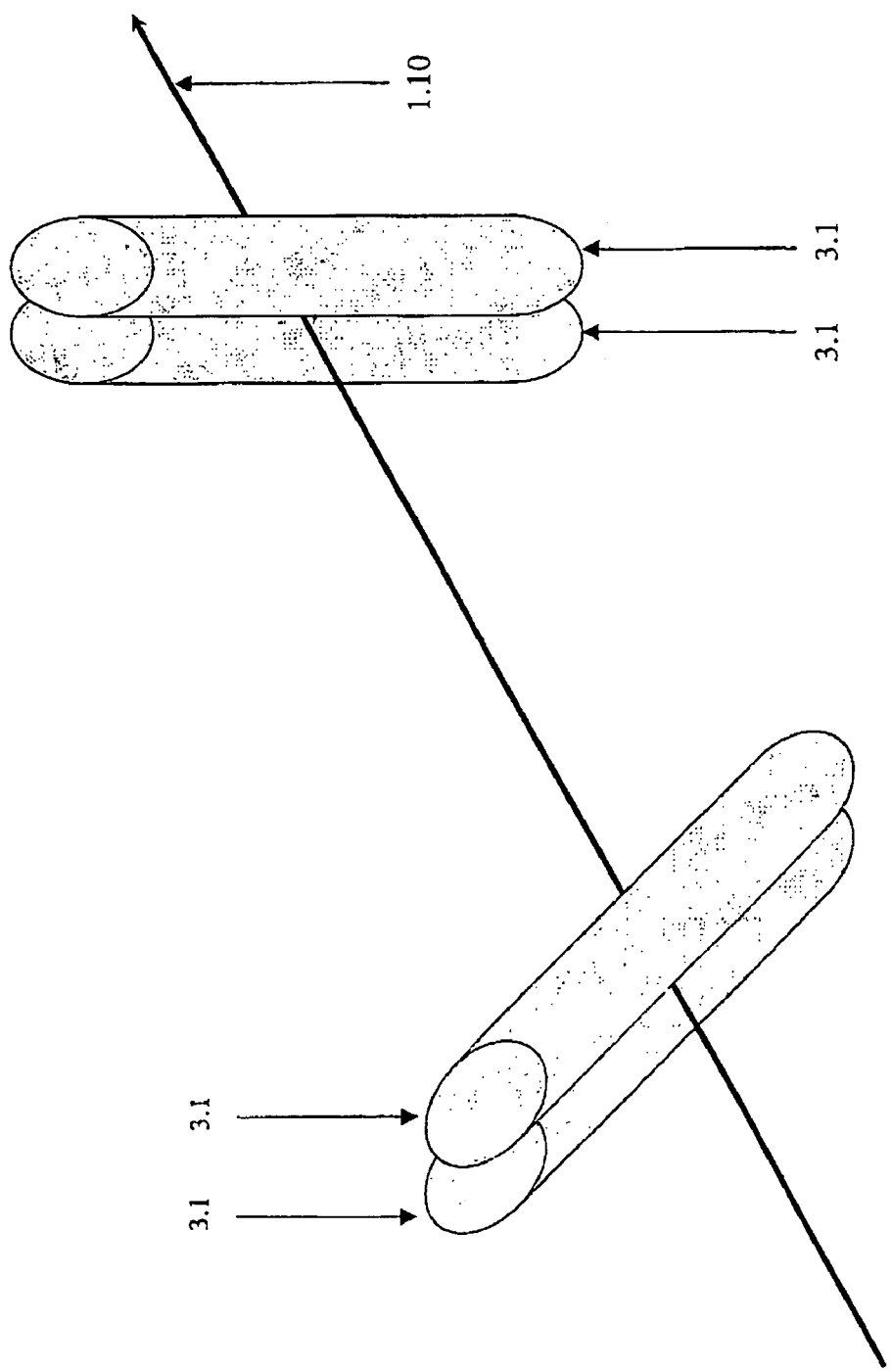
FIG. 3 shows squeezing devices acting on a fiber while it is being drawn.
Figure 4:
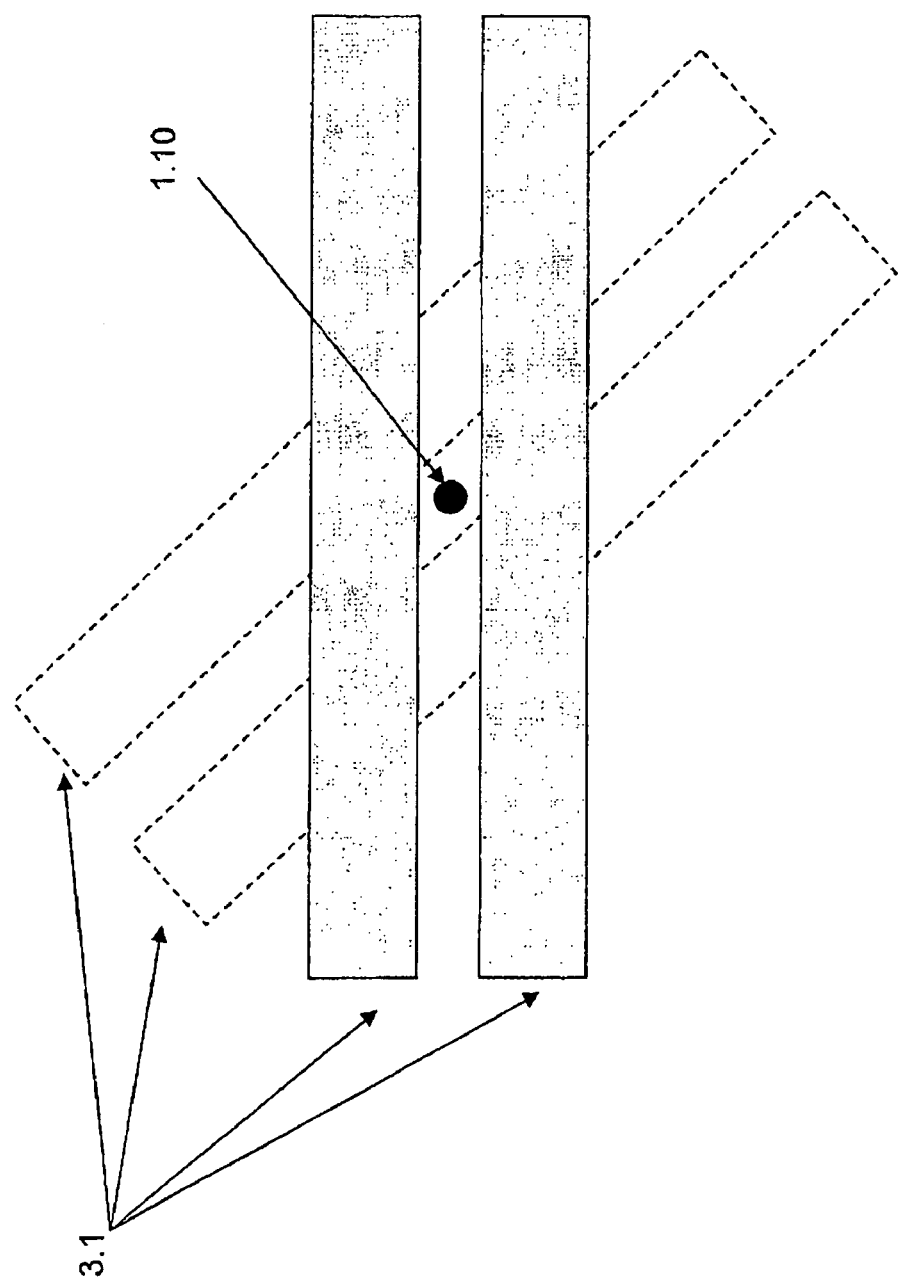
FIG. 4 shows an alternative view of squeezing devices acting on a fiber.

One possibility is to squeeze the fiber while it is being drawn so as to induce a permanent deformation. This idea is illustrated when the squeezing is realized by a pair of rollers in FIGS. 3 and 4. In these figures the fiber is denoted 1.10 and the rollers 3.1. The rollers are placed at an appropriate relative angle to each other. FIGS. 3 and 4 represent the same device, but in FIG. 3 one views the fiber from the side, whereas in FIG. 4 one views the fiber along its axis. The fiber is pulled through the rollers as indicated by the arrow on the fiber in FIG. 3.

For example, in order to implement the sequence (27) we need to produce $\sigma_z^{ph}$ and $\sigma_x^{ph}$ rotations. This can be done by squeezing along alternating axes (say along the horizontal direction and at 45 degrees to the horizontal). The squeezings need to induce an appropriate amount of birefringence so that the squeezed regions effectively behave as $\lambda/2$ plates and therefore implement the $\sigma_z^{ph}$ and $\sigma_x^{ph}$ rotations. A possibility is to have two squeezing mechanisms, one oriented horizontally and the other at 45 degrees to the horizontal and have them squeeze alternately, with an appropriate time delay, so that the fiber, after being drawn, ends up squeezed periodically along the desired axis.

Different combinations of squeezings (oriented along different axis, and producing different amounts of birefringence) can implement different sequences of rotations. Note that squeezing along the vertical and horizontal directions induces an effective control Hamiltonian which in one case is $H_c=+\sigma_z^{ph}$ and in the other is $H_c=-\sigma_z^{ph}$. This remark can be useful when implementing Continuous Compensating Sequences, and when trying to ensure that the defects and in particular the PMD of the control elements cancels (as in section 5).

In order to implement continuous rotations of polarization we can use a squeezing mechanism that continuously squeezes the fiber as it is drawn. The amount of squeezing can be varied continuously. The orientation of the squeezing device (and hence the axis of the rotation of polarization that the squeezing produces) can be varied continuously as well.

Figure 5:
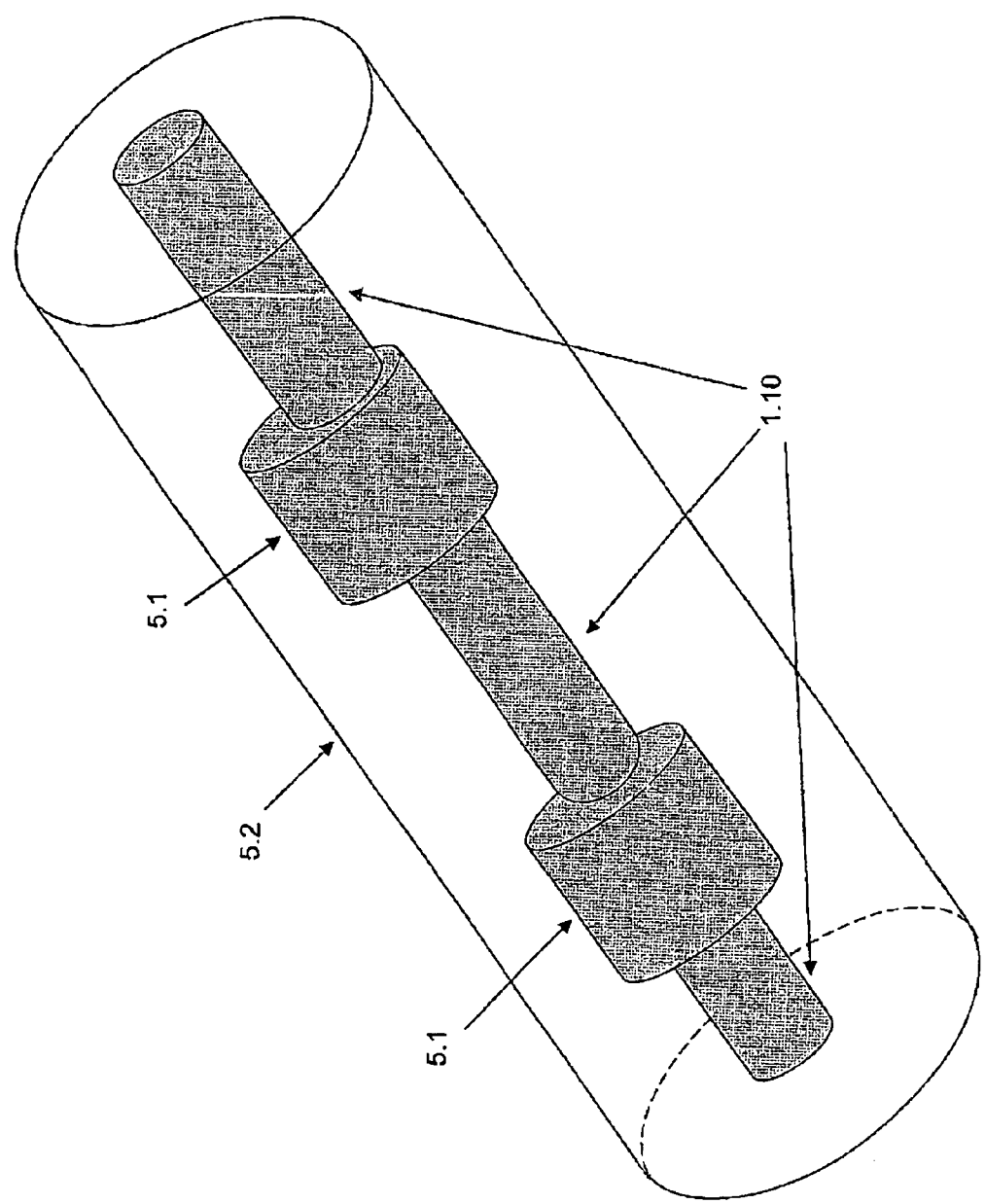
FIG. 5 shows the application of pressure to a fiber via non-uniform rings placed periodically on the fiber at different angles.

Another method for implementing the polarization rotations is to apply periodic pressure and/or bending via some of the coatings. (Here by coating we refer to any of the layers that cover the optical fiber; in practice each of the layers may have a specific name, such as inner coating, external coating, buffer, jacket, etc.) This can be done for example by using non-uniform (periodically modulated) coatings. One possibility is to periodically place on the fiber, or on one of the coatings of the fiber, little quantities of appropriate material (say in form of drops or non-uniform rings or any other appropriate shape) that are then covered by a normal uniform coating. The coating exerts pressure on these drops or rings which then press on the fiber. This is illustrated in FIGS. 5 and 6. In these figures the fiber is denoted by 1.10, the coating by 5.2. FIG. 5 illustrates the case where pressure is applied on the fiber via non-uniform rings (denoted 5.1) placed periodically on the fiber and at different angles. The rings 5.1 can be placed directly on the fiber or on one of the inner coatings. FIG. 6 illustrates the case where pressure is applied on the fiber via drops (denoted 6.1) placed periodically on the fiber at different angles. The drops can be placed directly on the fiber or on one of the inner coatings.

Another method consists of subjecting the fiber to anisotropic thermal stresses while it cools during drawing. This can be done for instance by subjecting the fiber to sideways jets of cold air, or sideways heating by laser beams or other heating devices, as it is being drawn. The anisotropic cooling leads to controlled stress, thus controlled birefringence and ultimately controlled rotations of polarization. The intensity and/or direction of the cooling or heating devices (jets or laser beams for instance) can be changed, so as to induce changes in the induced rotations of polarisation. As in the case of sequeezing we note that one can implement $H_C$ and its opposite $-H_C$ by making the cooling/heating act in orthogonal directions, and that this can be particularly useful when implementing self correcting sequences described in section 5.

Note that systems which rotate the polarisation will in general induce back reflection of light. This is an unwanted effect. However there are standard methods to reduce this back reflection, and in preferred embodiments the method comprises a step of reducing back reflection. One method is to put antireflection coating on bulk optical elements. In the cases where the control elements are introduced by modifying the birefringence of the fiber, back reflection will be minimized if the birefringence changes very little over a length equal to the wavelength of light.

We also note that all the above implementations, indeed, all the compensating sequences presented here, can be combined with the method of spinning the fiber during manufacturing [4][5] to obtain the benefits of both methods. In one preferred embodiment which combines the two methods, a polarisation flip, $\sigma_x^{ph}$ or $\sigma_z^{ph}$, is carried out after each spin period.

8. Preferred Sequences of Control Devices

We have presented a large number of different types of compensating sequences. They can be implemented separately or in different combinations. For example on the same fiber one can use a number of different ECS, in a random order. This prevents for any possible imperfections in a particular ECS to add-up systematically. One can also use a number of different PCS, in a random order. By its very definition, each PCS produces only partial compensation, but alternating them randomly produces further compensation.

A skilled person can select an appropriate sequence for a particular fiber, depending on the fiber optical and mechanical properties, details of fabrication process, etc. Thus for each particular type of fiber, a different sequence or combination of sequences may be preferred. In general Exactly Compensating Sequences are preferred to Partially Compensating Sequences.

Self-Correcting Sequences are also particularly preferred, see section 5. In this way the imperfections in the implementation of the polarization rotations cancel automatically.

We want to emphasize that although the sequences presented here are designed to produce best results when the constituent rotations are applied frequently enough such that the first order of perturbation applies, they also achieve some degree of compensation even outside this regime. On the other hand it can be shown that, when the first order of perturbation applies, the compensating sequences achieve better compensation if the length of the compensating sequence is shorter, see eq. (18). Thus it general it is preferred that the compensating sequences are as short as possible.

REFERENCES

[1] N. Gisin, J. P. Von Der Weid and J. P. Pellaux Polarization mode dispersion of short and long single mode fibers, IEEE J. Lightwave Technology, 9, 821-827, 1991.
[2] N. Gisin and J. P. Pellaux, Polarization mode dispersion: Time domain versus Frequency domain, Optics Commun., 89, 316-323, 1992.
[3] D. A. Nolan, X. Chen, M.-J. Li, Fibers with Low Polarization-Mode Dispersion, IEEE J. Lightwave Technology, 22, 1066, 2004.
[4] A. J. Barlow, J. J. Ramskov-Hansen, and D. N. Payne, Birefringence and polarisation mode-dispersion in spun single-mode fibers, Applied Optics, 20 (1981)
[5] Hart, Jr. Arthur C.; Huff, Richard G.; Walker, Kenneth L., U.S. Pat. No. 5,298,047 (1994).
[6] M J Li, D A Nolan, Fiber spin-profile designs for producing fibers with low polarization mode dispersion, Opt. Lett, 1998, Vol. 23, No. 21, 1659
[7] R E Schuh, X Shan, A S Siddiqui, Polarization mode dispersion in spun fibers with different linear birefringence and spinning parameters, IEEE J. Lightwave Technology, 16, 1583, 1998.
[8] X Chen, M J Li, D A Nolan, Polarization mode dispersion of spun fibers: an analytical solution, Opt. Lett, 2002, Vol. 27, No. 5, 294
[9] X Chen, M J Li, D A Nolan, Scaling properties of polarization mode dispersion of spun fibers in the presence of random mode coupling, Opt. Lett, 2002, Vol. 27, No. 18, 1595
[10] M. Chertkov, I. Gabitov, I. Kolokolov, T. Schafer, Periodic Compensation of Polarisation Mode Dispersion, J. Opt. Soc. Am. B 21 (2004) 486
[11] C. P. Slichter, Principles of Magnetic Resonance, 3rd. ed. (Springer Verlag, New-York, 1990)
[12] L.-A. Wu, H-K Lo and D. A. Lidar, Simple solution to Loss and decoherence in Optical Fibers, quant-ph/0307178v1
[13] L.-A. Wu and D. A. Lidar, Overcoming quantum noise in optical fibers, Phys. Rev. A 70, 062310 (2004)
[14] L. Viola and S. Lloyd, Dynamical suppression of decoherence in two-state quantum systems, Phys. Rev. A (1998) 2733, quant-ph/9803057
[15] N. Gisin, N. Linden, S. Massar and S. Popescu, Error filtration and entanglement purification for quantum communication, quant-ph 0407021, Phys. Rev. A 72, 012338 (2005)
[16] G. P. Agrawal, Nonlinear Fiber Optics, Third Edition, Academic Press, 2001

The invention claimed is:

1. A method for reducing spreading of a pulse in a transmission line, said spreading being as a result of polarization mode dispersion, comprising repeatedly inducing, at regular intervals along the transmission line, compensation sequences, comprising different predetermined polarization rotations of particle or wave components of the pulse.

2. A method according to claim 1, wherein the pulse is a classical pulse.

3. A method according to claim 1, comprising inducing predetermined polarization rotations at discrete locations along the transmission line.

4. A method according to claim 1, comprising continuously inducing predetermined polarization rotations along the transmission line.

5. A method according to claim 1, comprising inducing polarization rotation about two or more axes.

6. A method according to claim 5, wherein at a first discrete location, polarization rotation is induced about a first axis, and at a second discrete location, polarization is rotated about a second axis different to the first axis.

7. A method according to claim 1, comprising inducing polarization rotation about an axis which does not serve to maintain circular polarization.

8. A method according to claim 1, wherein the pulse comprises a plurality of photons.

9. A method according to claim 1, wherein the pulse comprises a plurality of electrons and/or holes.

10. A method according to claim 1, wherein two or more different sequences of polarization rotations are induced in the transmission line.

11. A method according to claim 1, wherein the length of the sequence is such that any polarisation rotating interaction present in the transmission line, other than the polarisation rotating interaction generated by the sequence itself, does not significantly modify a polarisation state of the particle or wave components over the length of the sequence.

12. A method according to claim 1, wherein the length of the sequence is such that any polarisation rotating interaction present in the transmission line, other than the polarisation rotating interaction generated by the sequence itself, does not significantly change over the length of the sequence.

13. A method according to claim 1, wherein said sequences partially compensate for the spreading of the pulse to first order in perturbation.

14. A method according to claim 1, wherein said sequences exactly compensate for the spreading of the pulse to first order in perturbation.

15. A method according to claim 1, wherein a sequence of polarization rotations is induced, such that polarization mode dispersion induced by individual polarization rotations is partially corrected by the overall sequence of polarization rotations.

16. A method according to claim 1, wherein a sequence of polarization rotations is induced in the transmission line, such that polarization mode dispersion induced by individual polarization rotations is completely corrected by the overall sequence of polarization rotations in the transmission line to first order in perturbation.

17. A transmission line comprising birefringent regions, wherein the birefringent regions are arranged to repeatedly induce, at regular intervals along the transmission line, a compensation sequence comprising different predetermined polarization rotations of particle or wave components of a pulse carried by the transmission line, such that spreading of the pulse due to polarization mode dispersion is suppressed.

18. A transmission line according to claim 17 which is an optical fiber.

19. A transmission line according to claim 17, wherein the birefringent regions are distributed at discrete locations along the transmission line.

20. A transmission line according to claim 17, comprising a continuous birefringent region running along a length of the transmission line.

21. A transmission line according to claim 19, wherein a birefringent region comprises a half wave plate.

22. A communication system comprising a transmission line as defined in claim 17.

23. A method for manufacturing a transmission line, comprising forming birefringent regions in the transmission line, wherein the birefringent regions are formed such that when a pulse is carried by the transmission line, the birefringent regions induce, at regular intervals along the transmission line, a sequence of predetermined polarization rotations of particle or wave components of the pulse, such that spreading of the pulse due to polarization mode dispersion is suppressed.

24. A method according to claim 23, wherein the transmission line comprises an optical fiber which is formed by drawing the fiber from a preform.

25. A method according to claim 24, comprising forming the birefringent regions during the step of drawing the fiber.

26. A method according to claim 24, comprising forming the birefringent regions after the step of drawing the fiber.

27. A method according to claim 24, further comprising impressing a spin on the fiber during the drawing step.

28. A method according to claim 24, comprising forming the birefringent regions by inducing stress in the fiber.

29. A method according to claim 24, comprising forming the birefringent regions by mechanically deforming the fiber.

30. A method according to claim 28, comprising applying pressure to the fiber.

31. A method according to claim 30, comprising compressing the fiber between a pair of rollers.

32. A method according to claim 30, comprising applying a non-uniform coating to the fiber.

33. A method according to claim 30, comprising applying a drop or non-uniform ring of a material to the fiber, and covering the fiber and material with a coating.

34. A method according to claim 28, wherein the stress is induced by anisotropic cooling of the fiber while it is being drawn.

35. A method according to claim 29, comprising bending the fiber.

* * * * *